July 13, 1965 K. ZWICK 3,194,548
CLAMPING ARRANGEMENT
Filed May 10, 1963 3 Sheets-Sheet 1

INVENTOR
Kurt Zwick
By Richard Lenb
Agt

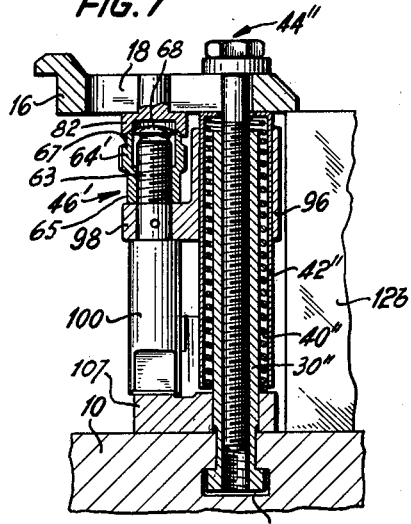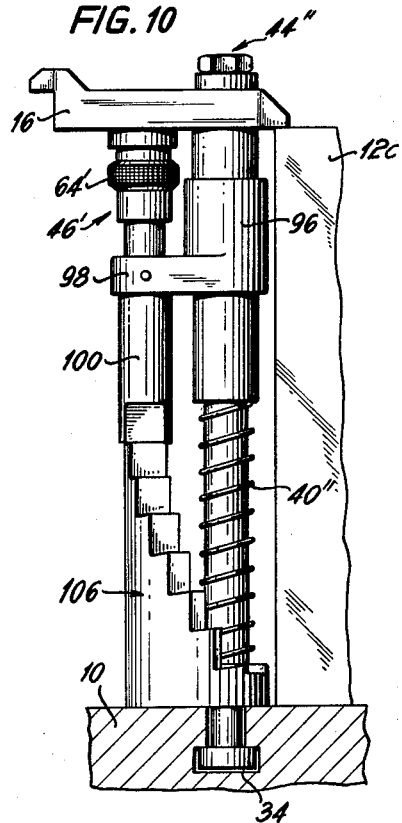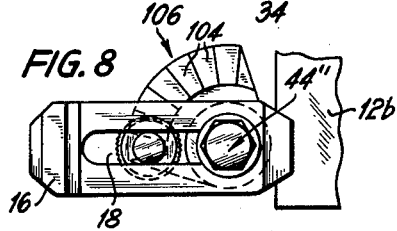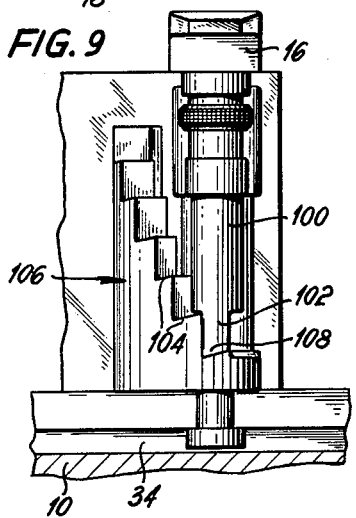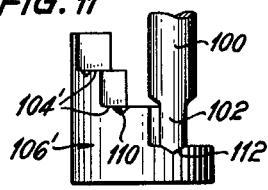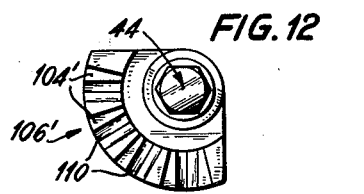
INVENTOR
Kurt Zwick

July 13, 1965 K. ZWICK 3,194,548
CLAMPING ARRANGEMENT
Filed May 10, 1963 3 Sheets-Sheet 3

INVENTOR
Kurt Zwick
By Richard Grund
Agt

United States Patent Office 3,194,548
Patented July 13, 1965

3,194,548
CLAMPING ARRANGEMENT
Kurt Zwick, Munich, Germany, assignor to Feinmechanik
G.m.b.H., Weilheim, Germany, a company of Germany
Filed May 10, 1963, Ser. No. 279,461
Claims priority, application Germany, May 21, 1962,
F 36,864
7 Claims. (Cl. 269—93)

This invention relates to a clamping arrangement for holding a workpiece and the like in a stationary position, and to a clamping attachment for releasably attaching the workpiece to a stationary support.

The principal object of the invention is the releasable fastening of workpieces differing in size and shape to a support by a versatile clamping attachment.

Another object is the provision of such an attachment which is steplessly and precisely adjustable to the clamped dimension of the workpiece.

A further object is the provision of a clamping attachment which is rugged and durable, and which is simple enough to be built at low cost.

Yet another object is the provision of a clamping attachment in which clamping stresses are distributed in such a manner as to avoid wear of movable elements.

With these and other objects in view, the invention in one of its aspects provides a clamping attachment which employs a two-armed lever as a clamping member. An abutment on one arm of the lever is arranged spacedly opposite the face of a support on which a workpiece is intended to be fixed. A tension member is adapted to be interposed between the support and the pivot portion of the lever, and a pressure member may be similarly interposed between the other lever arm and the support.

The tension member has one terminal portion pivotally fastened to the pivot portion of the lever, and fastening means are provided for fastening another terminal portion of the tension member to the support. The pressure member is pivotally secured to the aforementioned other terminal portion of the tension member and includes threaded adjustment means for moving the engaged lever arm in a direction away from the support when the adjustment means are threadedly moved.

Other features and many of the attendant advantages of this invention will be readily appreciated as the same becomes better understood by reference to the following detailed description when considered in connection with the accompanying drawing in which like reference numerals designate like parts throughout the figures thereof, and wherein:

FIG. 7 shows another embodiment of the invention in an elevationally sectional view;

FIG. 8 illustrates the apparatus of FIG. 7 in plan view;

FIGS. 9 and 10 are side-elevational, partly sectional views of the apparatus of FIG. 7 in different operational positions;

FIG. 11 shows a modified detail of the apparatus of FIGS. 7 to 10 in side elevation;

FIG. 12 is a plan view of the detail of FIG. 11;

Figure 1:
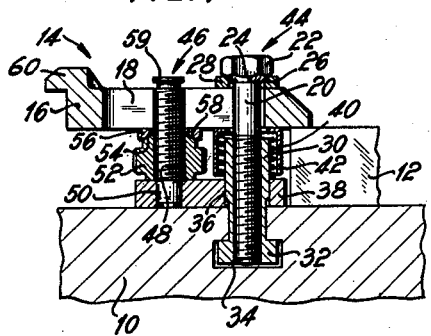
FIG. 1 is an elevational sectional view of a first embodiment of the clamping arrangement of the invention.
Figure 3:
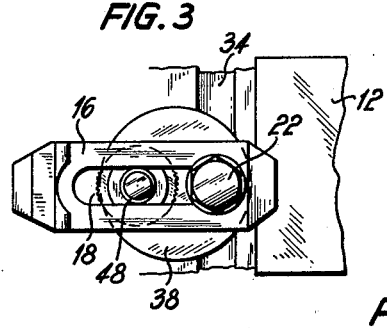
FIG. 3 shows the apparatus of FIG. 1 in plan view.

Referring now to the drawing in detail, and initially to FIGS. 1 and 3, there is shown a supporting table 10 having a flat top face. A workpiece 12 is held to the table face by a clamping attachment 14. The clamping member of the attachment is a lever 16 formed with a longitudinal slot 18. A bolt 20 passes freely through the slot 18. The hexagonal head 22 of the bolt is arranged above the lever 16. A washer 28 is interposed between the head 22 and the top surface of the lever 16. A spherical annular face 24 on the underside of the head 22 forms a universal joint with a conforming socket face 26 of the washer 28.

An internally threaded sleeve 30 engages the threads of the bolt 20. An integral flange 32 on the lower terminal portion of the sleeve 30 is slidably received in an elongated guide groove 34 of the table 10. The cross-section of the groove 34 has the shape of an inverted T and conforms of the shape of the flange 32 and of the adjacent part of the sleeve 30. A circular base member 38 has a bore 36 in which the sleeve 30 is movably received so that the base member 38 is pivotable about the axis of the bolt 20, and axially slidable on the sleeve 30.

A helical compression spring 40 is coiled about the bolt 20 and the sleeve 30. Its ends abut against the top face of the base member 38 and the bottom facec of the lever 16 so as to urge the base member against the top face of the table 10, and to ensure pivotable engagement of the conforming faces 24 and 26 on the head 22 and the washer 28. A tubular shell 42 encloses and protects the spring 40 in the position of the clamping attachment illustrated in FIG. 1, and limits the threaded movement of the bolt 20 toward the table 10 in the sleeve 30.

The bolt 20, the threaded sleeve 30, and associated elements jointly constitute a tension member 44 which is under tensile stress during operation of the clamping attachment, and on which the lever 16 is pivoted.

A corresponding pressure member 46 which engages an arm of the lever 16 in the position of the clamping attachment illustrated in FIG. 1, includes an upright threaded pin 48 the lower end of which is fixedly fastened in a bore 50 of the base member 38 radially spaced from the axis of the bolt 20. A knurled ring nut 52 is threadedly movable on the pin 48. The annular top face of the nut 52 is spherically rounded, and conformingly engages the lower annular face 58 of a washer 56. The washer 56 is held against the underside of the lever 16 by the nut 52, whereby the clamping pressure is transmitted from the lever to the table 10 by the nut 52, the pin 48 and the base member 38.

The upper terminal portion of the pin 48 passes through the slot 18 in the lever 16 and carries a flange-shaped abutment 59 dimensioned freely to pass through the slot 18. The abutment limits threaded upward movement of the nut 52 on the pin 48 beyond a position in which almost all turns of the internal threads in the nut 52 are still engaged with the corresponding threads of the pin 48.

The aforedescribed clamping attachment is operated as follows:

The flange 32 is engaged in the guide groove 34, and moved along the groove until the clamping attachment is located at the portion of the table 10 on which it is intended to clamp a workpiece. The hexagonal head 22 is then turned until the spacing between the lever 16 and the flat top of the table 10 is slightly greater than the height of the workpiece 12. The workpiece is inserted under the abutment face on the underside of the lever 16 adjacent the bolt 20, as shown in FIG. 1, and the nut 52 is moved upward on the pin 48 until the lever is pivoted on the bolt head 22 into engagement with the top face of the workpiece 12 under sufficient clamping pressure. In the operative position of the clamping arrangement shown in FIG. 1, the tension member 44 is under tensile stress, and the workpiece and the pressure member 36 are under compressive stress.

The end portion 60 of the lever 16 which is spaced from the pressure member 46 in a direction away from the tension member 44 when the apparatus is assembled as shown in FIG. 1, has a lower abutment face which is upwardly offset from the remainder of the bottom face of the lever 16. As is evident from FIG. 1, the lever 16 is readily removed from the tension member 44 and pressure member 46, and may be assembled again with these members in such a manner that the end portion 60 is spaced from the tension member in a direction away from the pressure member. In the assembled condition of the clamping arrangement illustrated in FIG. 2, a substantially higher workpiece 12a can be clamped between the lever 16 and the table 10 than can be handled by the clamping arrangement illustrated in FIG. 1 while a different portion of the lever 16 coperates with the pivot on the head 22 than in the arrangement illustrated in FIGS. 1 and 2, the operation of the device of FIG. 2 is closely similar to that described hereinabove with reference to FIGS. 1 and 3, and a more detailed description of its operation is unnecessary.

Figure 2:
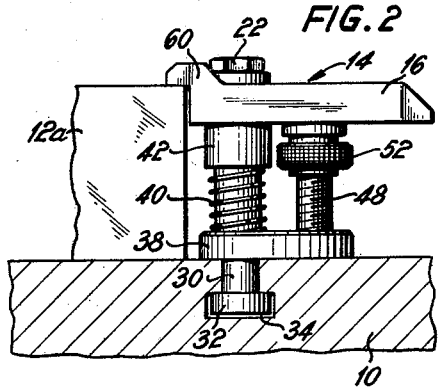
FIG. 2 is a sectional view of the apparatus of FIG. 1 in a different operational position.
Figure 4:
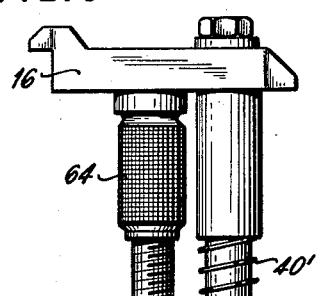
FIG. 4 illustrates a modified embodiment of the invention in a view corresponding to that of FIG. 1.

The modified embodiment of the invention illustrated in FIG. 4 has a clamping lever 16 identical with that of FIGS. 1 to 3, and attached to a table 10 by a tension member 44' identical with the tension member 44 except for the axial dimensions of the bolt 20', the sleeve 30', the spring 40', and the shell 42' which are greater than the axial dimensions of the corresponding elements 20, 30, 40, and 42 of the tension member 44. The tension member 44' is secured in a guide slot 34 of the table 10 in the same manner as the tension member 44.

The base member 38' which transmits the clamping pressure to the table 10 differs in its dimensions only from the aforedescribed base member 38. An upright threaded pin 62 is fixed in the base member 38'. It engages an elongated nut or sleeve 64 by means of threads 66. An axial recess 72 in the pin 62 holds a flanged cup shaped stop member 68 which is axially slidable in the recess 72. In the retracted position of the stop member 68 illustrated in FIG. 4 the flange 70 of the member abuts against flat annular top face portions of the pin 62 and of the sleeve 64. When the sleeve 64 is threadedly moved upward on the pin 62, the cup-shaped member 68 is lifted from the top face of the pin 62 by the sleeve 64. A pin 74 axially fastened in the threaded pin 62 slidably passes through a central opening in the bottom of the cup member 68 and has a head 76 larger than that opening, but axially slidable within the cup member 68. Engagement of the head 76 with the bottom of the cup member 68 thus limits upward threaded movement of the sleeve 64 on the pin 62.

A spherically rounded annular portion 78 on the top face of the sleeve 64 conformingly engages a spherically shaped socket 80 on the underside of an abutment member 82 engaging the underside of the lever 16. A guide pin 84 on the abutment member 82 constitutes the upper end of the pressure member. It engages the slot 18 of the lever, and prevents relative angular movement of the lever 16 and the base member 38' about the axis of the tension member 44'. It will be appreciated that the abutment member 82, the sleeve 64, the pin 62, and the base member 38' jointly constitute the pressure member of the clamping arrangement shown in FIG. 4.

The operation of the device illustrated in FIG. 4 is entirely analogous to that of the apparatus shown in FIG. 1. The clamping height of the device may be varied over a range indicated by a double arrow h by threadedly shifting the relative position of the bolt 20' and sleeve 30', and of the pin 62 and the sleeve 64. Even in the fully extended position of the clamping device indicated by broken lines in FIG. 4, the threads 66 of the pin 62 and of the sleeve 64 are engaged over more than one half of the axial length of the sleeve because of the limitation imposed by the pin 74, and by the cup shaped stop member 68 on the movement of the sleeve.

The maximum clamping range of the device shown in FIG. 4 may be further increased by reversing the position of the lever member 16 in the manner illustrated in FIG. 2.

Figures 5, 6:
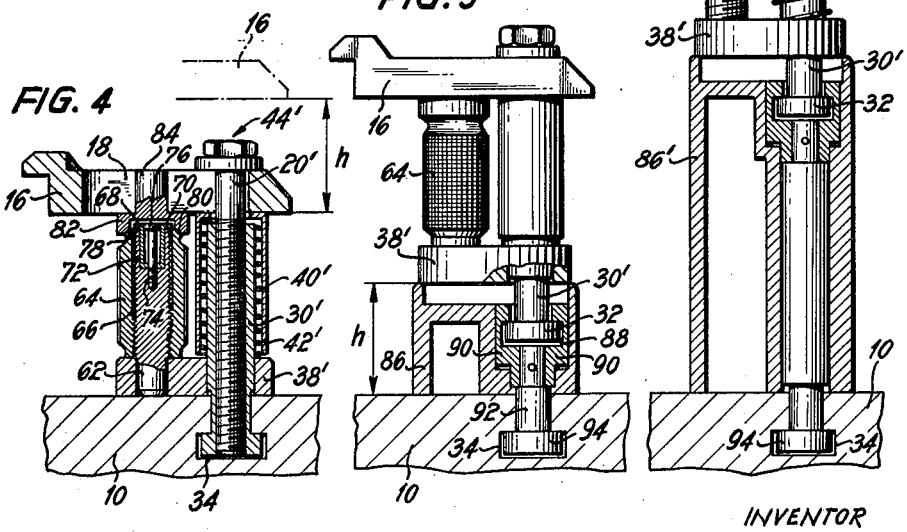
FIG. 5 shows the apparatus of FIG. 4 supplemented by a spacer block, the view being in elevation and partly in section.
FIG. 6 shows the apparatus of FIG. 4 equipped with a spacer block different from that illustrated in FIG. 5, the view of FIG. 6 generally corresponding to that of FIG. 5.

The clamping height of the arrangement of the invention may be further increased by interposing a spacer block 86 under the apparatus shown in FIG. 4 as illustrated in FIG. 5. The height of the spacer block is equal to the range h of threaded movement of the sleeve 64 on the pin 62. In order to transmit tensional forces from the flange 32 of the sleeve 30' to the guide groove 34 in the table 10, the spacer block 86 is equipped with an extension member 90 vertically movable in the block and having a guide groove 88 identical in shape with the guide groove 34 for receiving the flange 32. A pin 92 fixedly fastened to the extension member 90 extends downward from the spacer block 86, and carries a flange 94 conformingly received in the guide groove 34, and constituting auxiliary fastening means.

A set of spacer blocks differing in height from each other by the range h permits the clamping height of the arrangement of FIG. 4 to be adjusted steplessly from the minimum shown in FIG. 4 to the height between the lever 16 and the table 10 shown in FIG. 6 which illustrates a spacer block 86' having a height of 3×h interposed between the apparatus of FIG. 4 and the table 10. The spacer block 86' differs from the block 86 shown in FIG. 5 in its vertical dimensions only and carries an extension member with a pin similarly related to the extension member 90 and pin 92 illustrated in FIG. 6.

In the modified embodiments of the invention illustrated in FIGS. 7 to 14, the spacer blocks shown in FIGS. 5 and 6 are replaced by or supplemented with a modified base member which transmits compressive stresses from the lever 16 to the table 10. The tension members 44', 44'' shown in FIGS. 7 to 10 differ only by their greater axial length or the height of their component parts such as the spring 40'' and shell 42'' from the corresponding elements shown in the aforedescribed clamping arrangements and do not required further description.

The clamping attachment mounted on the table 10 in the showing of FIG. 7 has a pressure member 46' which includes a sleeve 64' mounted on a pin 63. Only the lower portion 65 of the sleeve 64' is threaded, and the upper portion 67 has a smooth bore of greater internal diameter than that of the threaded portion 65. A stop member 68 is axially movable in the pin 63 in the manner described above with reference to FIG. 4 and engages a shoulder formed at a juncture of the sleeve portions 65, 67 so as to limit upward threaded movement of the sleeve 64' on the pin 65, and to maintain engagement of a sufficient number of threads between the sleeve 64' and the pin 63.

An abutment member 82 of the type illustrated in FIG. 4 connects the top face of the sleeve 64' with the lever 16. The pin 63 is attached to the tension member 44'' by a bracket 98 integral with a smooth sleeve 96 which is rotatable and axially slidable on the shell 42''. An auxiliary column 100 is attached to the pin 63 and extends downward from the bracket 98 for engagement with a base member 106 the configuration of which will best be understood by joint consideration of FIGS. 7 to 10.

The base member 106 which acts as pressure transmitting means has the shape of a fragment of a hollow, axially closed cylinder. Steps 104 cut into the cylindrical wall of base member 106 are arranged in a helix about the axis of the tension member 44'', and a radial end wall portion 107 of the base member 106 pivotally engages the sleeve 30" of the tension member 44". The several steps 104 are thus alignable with the reduced lower end portion 102 of the auxiliary column 100. As shown in FIG. 9, the contact portion 108 of the column 100 is cut off in an obliquely inclined plane and conforms to the configuration of the steps 104 the top contact faces of which slope obliquely inward from an exposed edge. The downward pressure exerted by the lever 16 on the pressure member 46' thus tends to move the lower end portion 102 of the column 100 into conforming engagement with the steps of the base member 106.

By selectively engaging the column 100 with the steps 104, the clamping height of the apparatus illustrated in FIGS. 7 to 10 may be varied from the height of the workpiece 12b shown in FIG. 7 to that of the workpiece 12c seen in FIG. 10, and somewhat further by reversing the lever 16 in the manner illustrated in FIG. 2. The difference in spacing of adjacent steps 104 from the pressure transmitting bottom face of the base member portion 107 is at most equal to the range of threaded adjustment of the sleeve 64' on the pin 63, so that the clamping device is capable of stepless adjustment of its clamping height.

A modification of the contact faces on the auxiliary column 100 and on a cooperating base member 106' is shown in FIGS. 11 and 12 in side elevation and plan view respectively. The steps 104' of the base member 106' are formed with grooves 110 of V-shaped section, and a V-shaped projection 112 on the lower end portion 102 on the column 100 is matingly engageable with the grooves 110 to secure the relative position of the column 100 and of the base member 106'.

Figure 13:
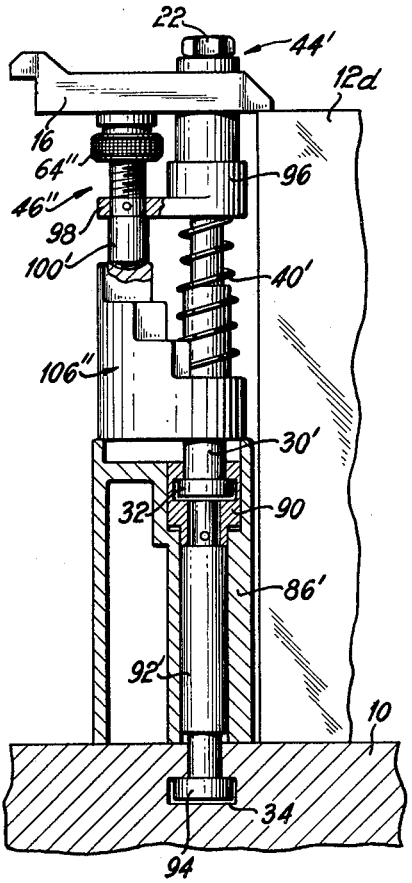
FIG. 13 shows yet another embodiment of the invention in elevation, and partly in section.
Figure 14:
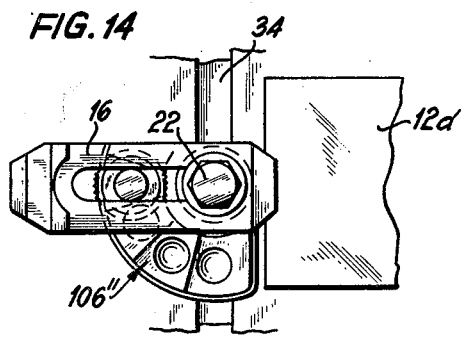
FIG. 14 is a plan view of the apparatus of FIG. 13.

A further modification of cooperating contact faces of an auxiliary column 100' and a stepped base member 106" is shown in FIG. 13 in which the bottom end of the column 100' has the shape of a spherical segment, and the steps of the base member 106" are each formed with a corresponding spherical depression. FIG. 13 also shows that a clamping arrangement of the type illustrated in FIGS. 7 to 12 may be further combined with a spacer block 86' of the type shown in FIG. 6 further to increase the range of operations of my clamping device. The steps of the base member 106" are equal in height to the range of vertical adjustment of the knurled sleeve 64" of the pressure member 46" shown in FIG. 13, and the combined range of adjustment available by selection of steps on the base member 106" and by movement of the nut or sleeve 64" is equal to the height of the spacer block 86'. A workpiece 12d having a greater height than the workpieces 12, 12a, 12b, or 12c may thus be accommodated on the apparatus shown in FIG. 13, and also illustrated in a plane view in FIG. 14.

The clamping arrangement of the invention is capable of holding workpieces of greatly varying size and shape to a support. Within the range of workpiece dimensions, the clamping height of the arrangement can be steplessly adjusted. The apparatus is durable and rugged, and can be built at low cost since the only elements having critical dimensions are the engaging threads on the tension and pressure members. Such threads are readily and inexpensively made.

The stop means of the invention which prevent excessive disengagement of threaded members make it impossible that operating forces are concentrated on an inadequate number of thread turns. The distribution of the clamping pressure on a relatively large number of threaded turns reduces wear in the threads, and increases the useful life of the device. The universal joints connecting the clamping lever to the tension and pressure members avoid the transmission of bending stresses, and further contribute to the long useful life of the apparatus.

Threads are used as sole adjustment means only in those embodiments of the invention in which a narrow range of clamping heights is acceptable. Where a wider range is desired, threadedly movable adjustment means are employed for fine adjustment only, whereas coarse adjustment is made by means of spacer blocks or stepped base members whose dimensions thus are not critical.

It should be understood of course that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A clamping attachment for clamping a workpiece to a support comprising, in combination:
   (a) a lever member having a pivot portion and two arm portions;
   (b) a tension member having one terminal portion pivotally fastened to said pivot portion and another terminal portion spaced from said lever member in a predetermined direction;
   (c) fastening means for fastening said other terminal portion to said support;
   (d) abutment means on one of said arm portions and facing in said direction;
   (e) a pressure member engageable with the other one of said arm portions, said pressure member including
      (1) threaded adjustment means for moving said other arm portion in a direction opposite to said predetermined direction when said adjustment means are threadedly moved, and
      (2) a base member having a portion mounted on said tension member for pivotal movement about an axis extending in said predetermined direction, and another portion radially spaced from said axis,
      (3) said adjustment means being interposed between said other portion of said base member and said other arm portion when the same is engaged by said pressure member and including a threaded pin member fixedly fastened to said other portion of said base member, and a nut member threadedly engaging said pin member,
      (4) said other arm portion of said lever member being formed with an aperture, an end portion of said pressure member extending into said aperture; and
   (f) stop means on said pin member for limiting threaded movement of said nut member on said pin member
      (1) said pin member having an axis and an axial end portion spaced from said base member, said end portion being formed with an axial bore,
      (2) said stop means including a stop member axially movable inward and outward of said bore, and means for limiting said outward movement of said stop member, said stop member having an abutment face axially engageable by said nut member during threaded movement of said nut member on said pin member in a direction away from said base member.

2. A clamping attachment for clamping a workpiece to a support comprising, in combination:
   (a) a lever member having a pivot portion and two arm portions;
   (b) a tension member having one terminal portion pivotally fastened to said pivot portion and another terminal portion spaced from said lever member in a predetermined direction;
   (c) fastening means for fastening said other terminal portion to said support;
   (d) abutment means on one of said arm portions and facing in said direction;

(e) a pressure member engageable with the other one of said arm portions and including
　　(1) threaded adjustment means for moving said other arm portion in a direction opposite to said predetermined direction when said adjustment means are threadedly moved, and
　　(2) pressure transmitting means mounted on said tension member and engageable with said adjustment means and said support when said tension member is fastened to said support by said fastening means for transmitting to said support pressure exerted by said lever member on said pressure member in said predetermined direction,
　　　　(i) said pressure transmitting means including a pressure transmitting member having a stepped face formed with a plurality of steps selectively engageable with said adjustment means, and a pressure transmitting face engageable with said support,
　　(3) said tension member having an axis extending in said predetermined direction, said stepped face being axially spaced from said pressure transmitting face, and the steps of said stepped face being arranged in a helix about said axis; and
(f) bracket means mounted on said tension member for pivotal movement about said axis and attached to said adjustment means.

3. An attachment as set forth in claim 2, wherein said adjustment means include two threadedly engaged members respectively engageable with said pressure transmitting member and said other arm portion, and stop means for limiting threaded movement of said members in a direction away from each other.

4. An attachment as set forth in claim 2, wherein said pressure member and said other arm portion have respective spherically arcuate contact faces, said contact faces being conformingly engageable.

5. An attachment as set forth in claim 2, further comprising stop means for limiting movement of said pressure member in said opposite direction to a distance substantially equal to the axial spacing of two steps of said stepped face adjacent each other along said helix.

6. An attachment as set forth in claim 2, wherein said adjustment means have a contact face obliquely inclined relative to said axis, each of said steps being shaped conformingly to receive said contact face.

7. An attachment as set forth in claim 2, further comprising universal joint means interposed between said tension member and said pivot portion for fastening said tension member to said lever member, the lever member being elongated and longitudinally adjustable on said joint means.

References Cited by the Examiner
UNITED STATES PATENTS

| | | | |
|---|---|---|---|
| 162,866 | 5/75 | Squire | 269—94 |
| 742,096 | 10/03 | Long | 269—246 X |
| 996,244 | 6/11 | Hess | 269—243 X |
| 2,162,611 | 6/39 | Dreher | 269—91 X |
| 2,172,461 | 9/39 | Whitescarver | 269—243 X |
| 2,650,523 | 9/53 | Zwick | 269—93 |

ROBERT C. RIORDON, *Primary Examiner.*